L. N. SMITH.
GRAPPLE.
APPLICATION FILED SEPT. 2, 1916.
1,305,175.
Patented May 27, 1919.
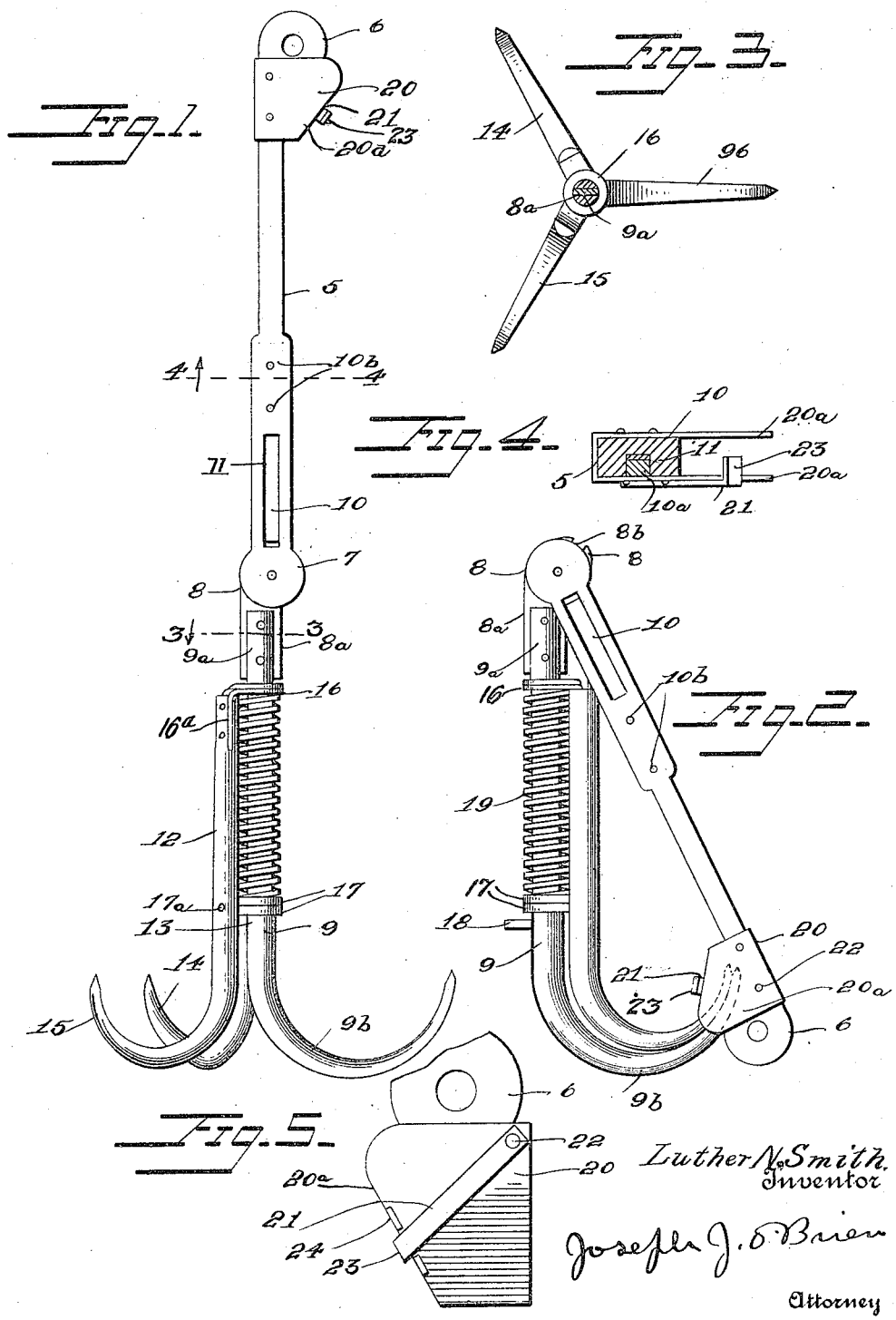
Luther N. Smith,
Inventor
Joseph J. O'Brien
Attorney

UNITED STATES PATENT OFFICE.

LUTHER N. SMITH, OF MUNSONVILLE, NEW HAMPSHIRE.

GRAPPLE.

1,305,175.   Specification of Letters Patent.   Patented May 27, 1919.

Application filed September 2, 1916. Serial No. 118,292.

*To all whom it may concern:*

Be it known that I, LUTHER N. SMITH, a citizen of the United States, residing at Munsonville, in the county of Cheshire and State of New Hampshire, have invented certain new and useful Improvements in Grapples, of which the following is a specification.

This invention relates to improvements in grapples for use of trappers, and its principal object is to provide a simple and strong device which is provided with a plurality of hooks mounted to fold together and having a foldable shank provided with a sheath for engaging over the points of the hooks, so that the device can be carried in the trapper's pocket, or in his game-bag, without danger of catching into and tearing either of these articles or injuring the person.

With the above and other objects in view, the invention consists of certain new constructions and arrangement of parts as clearly described in the following specification and fully illustrated in the accompanying drawing, in which:—

Figure 1, is a side view of the improved grapple shown in open position.

Fig. 2, is a similar view showing the grapple in a closed position.

Fig. 3, is a cross-section on the line 3—3 of Fig. 1.

Fig. 4, is a cross-section on the line 4—4 of Fig. 1, and Fig. 5, is an enlarged side view of the chain attaching end of the shank, showing the opposite side of the hook-point sheath to that side shown in Figs. 1 and 2.

Similar reference numerals in all of the figures of the drawing designate like parts.

Referring to the drawing, 5 designates a shank which is formed at one end with an eye 6, and at its other end with a portion 7, to which is pivotally connected a plate 8, one end 8ª of which is secured in a slot formed in the end of a hook-shank 9ª of a hook 9. In the edge of the plate 8, on the opposite side of its pivot from the end 8ª, is formed a notch 8ᵇ, the same being adapted to receive the free end of a latch 10 which is mounted to move in a slot 11 formed in the shank 5, said latch being preferably formed of spring metal so that it will snap into the notch 8ᵇ.

On the hook-shank 9ª is pivotally mounted the hooks 14 and 15, the respective shanks 13 and 12 of which, extend in parallel and close relation to and with the shank of the hook 9, and each shank 12 and 13 is provided with spaced collars 16 and 17 which encircle the shank 9ª, to form a pivoted supporting means for the respective hooks 14 and 15. The hook portions of the hooks 14 and 15 are preferably smaller than the portion 9ᵇ of the hook 9, so that when the hooks are forced to the folded position, as shown in Fig. 2 of the drawing, they will nest closely within the hook portion 9ᵇ.

In the open position of the device, the hooks are radially extended, as clearly shown in Fig. 3, and hooks 14 and 15 are held in this position by a spring 19 which is mounted around the shank 9ª and whose ends engage one of the collars 16 of one of the hooks and one of the collars 17 of the other hook, in a manner to force the hooks 14 and 15 in opposite directions around the shank 9ª. Hook 9 is provided with a stop-pin 18 which is engaged by and limits the opening movement of the hooks 14 and 15.

Adjacent the free end of the shank 5 is secured a U-shaped plate 20, the sides 20ª of which project beyond the shank 5 to form a pocket or sheath for the reception of the points of the hooks when the grapple is folded, as clearly shown in Fig. 2 of the drawing, and to lock the shank 5 in its folded position with the points of the hooks in the sheath, a locking-hook 23 is provided, the same being pivoted at 22 upon one of the sides of the sheath, and is provided with a lip or tongue 21 which is bent at right-angles to the body-portion to project across the mouth of the pocket, and in a position to engage the ends of the hooks and thereby prevent the withdrawal of the sheath.

The front edges 20ª of the sheath are preferably formed inclined to the shank 5, so that the locking lip 21 will lie close to the ends of the hooks when the device is folded, and to retain the lock in its locking position, the sheath is provided with spaced lugs 24, between which the body-portion of the lock will engage, said body-portion being resilient so that it will spring into the locking position. The sheath is secured upon the shank 5 by the rivets 22, and the spring-lock 10, or latch, is retained to the shank by the rivets 10ᵇ.

In operation, the trapper carries the grapple folded, with or without a suitable trap attached by a chain connected to the eye 6. He sets his trap in the usual manner, with the grapple attached and in a folded position, so that both the trap and grapple can be easily concealed with brush or otherwise. At the time the grapple is set, the trapper first releases the resilient lock 23 from its keepers 24, and then turns the lock on its pivot 22 in the direction of the shank to uncover the points of the hooks, so that, when the animal is caught in the trap and starts to run away, the continued tugging or pulling on the shank 5, through the trap-connecting chain (not shown), and which is secured to the eye 6, will detach the sheath 20 from the points of the hooks, and then immediately spring 19 will throw the hooks to open position.

With the hooks open, the grapple will form a drag against the pull of the trapped animal, as the points of the hooks will claw in the grass, ground, snow, or any obstructions in their path, and thereby not only retard the progress of the trapped animal, but will also leave a marked trail by which the trapper may trace and find his game. It is obvious that when the hooks are opened, they will at once form a resistance against the pull upon the shank portion, consequently the two sections of the grapple will straighten out into alinement with each other and presenting the points of the hooks in the direction of the pull, and the spring-latch 10 will lock the sections in their alined position, so that a continued pull thereafter will be directly opposed by the hooks.

Having thus fully described the invention, what is claimed is:—

1. A grapple, comprising a shank, a main hook pivoted at one end to said shank, a series of adjustable hooks each being provided with supporting means pivoted upon the shank of said main hook, whereby said hooks can be folded together sidewise, a sheath on the free end of said shank to cover the points of all of said hooks when in a folded position, and means for holding said hooks spread apart in radial lines.

2. A grapple, comprising a shank, a main hook pivoted at one end to said shank, a series of adjustable hooks each being provided with a supporting means pivoted upon the shank of said main hook, whereby said hooks can be folded together sidewise, a sheath on the free end of said shank to cover the points of all of said hooks when in a folded position, and a spring mounted upon the shank of the main hook between the supporting means of the adjustable hooks and having its opposite ends engaged with a supporting means of a separate adjustable hook, said spring adapted to hold said hooks apart in radial lines.

3. A grapple, comprising a shank, a main hook pivoted at one end to said shank, said shank being foldable toward the point of said main hook, means for locking the shank in alinement with the shank of said main hook, a series of adjustable hooks each being provided with a supporting means pivoted upon the shank of said main hook, whereby said hooks can be folded together sidewise, a sheath on the free end of said shank to cover the points of all of the hooks when in a folded position, and means for holding the hooks spread apart in radial lines.

4. A grapple, comprising a shank, a main hook pivoted at one end to said shank, said shank being foldable toward the point of said hook, a series of hooks each being provided with a supporting means pivoted upon the shank of said main hook, whereby said hooks can be folded together sidewise, a sheath on the free end of said shank to cover the points of all of said hooks when in a folded position, a spring for spreading said hooks apart, and a stop projecting from the shank of said main hook to limit the opening movements of said adjustable hooks.

5. A grapple, comprising a shank, a main hook pivoted at one end to said shank, said shank being foldable toward the point of said hook, a series of adjustable hooks having a hooked portion smaller than the main hook, whereby they will nest with said main hook when in a folded position, each of said adjustable hooks being provided with a supporting means pivoted upon the shank of said main hook, whereby said hooks can be folded together sidewise, a sheath on the free end of said shank to cover the points of all of said hooks when in a folded position, and means for spreading said hooks apart in radial lines.

6. A grapple, comprising a shank, a main hook pivoted at one end to said shank, said shank being foldable toward the point of said hook, a series of adjustable hooks each being provided with a supporting means pivoted upon the shank of said main hook, whereby said hooks can be folded together sidewise, a sheath on the free end of said shank to cover the points of all of said hooks when in a folded position, a lock carried by said sheath to prevent its accidental displacement from the points of the hooks, and means for spreading said hooks apart in radial lines.

In testimony whereof I affix my signature in the presence of two witnesses.

LUTHER N. SMITH.

Witnesses:
FREDERICK E. SHAW,
LILLIAN M. SAUNDERS.